UNITED STATES PATENT OFFICE.

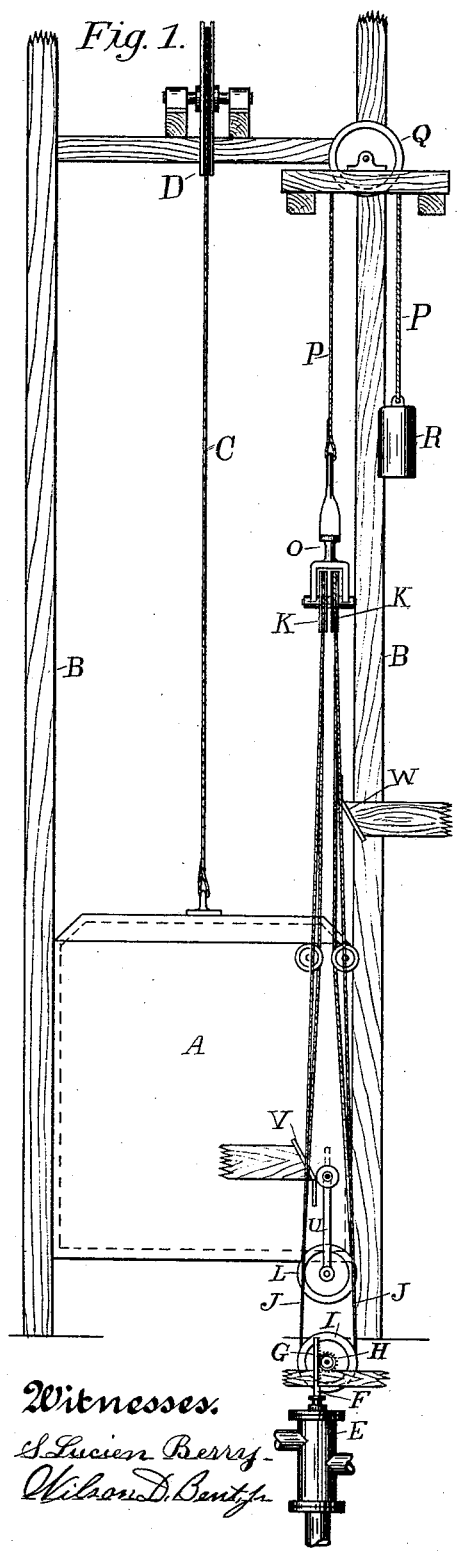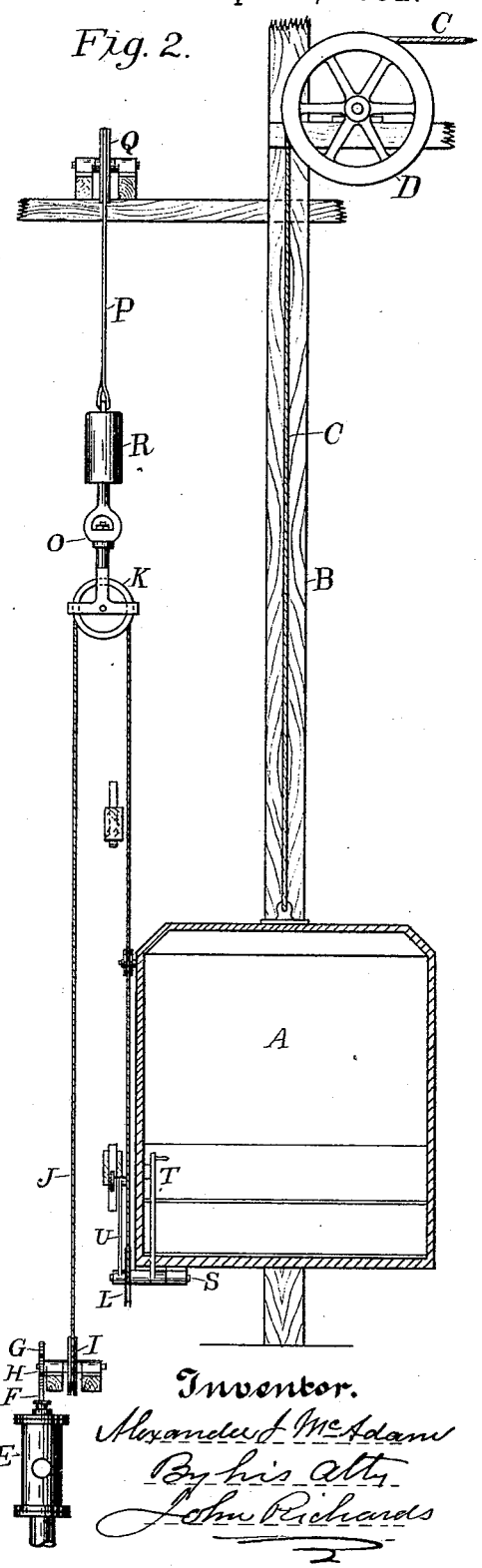

ALEXANDER J. McADAM, OF SAN FRANCISCO, CALIFORNIA.

ELEVATOR-CONTROLLING MECHANISM.

SPECIFICATION forming part of Letters Patent No. 482,131, dated September 6, 1892.

Application filed April 21, 1892. Serial No. 430,082. (No model.)

*To all whom it may concern:*

Be it known that I, ALEXANDER J. McADAM, a citizen of the United States, residing in the city and county of San Francisco, State of California, have invented certain new and useful Improvements in Elevator-Controlling Mechanism; and I hereby declare the following specification, with the drawings forming a part of the same, to be a full and complete description of my invention.

My invention relates to elevators for raising or lowering passengers or goods and to maintaining from the cages thereof convenient control of the valves in the case of hydraulic elevators or the driving-gearing in the case of elevators driven by belts or shafts; and it consists in the employment of ropes or chains extended from the cage of such elevators to valves, belts, shifting devices, or other gearing for controlling the movements or stoppage of the cage, the ropes or chains passing over pulleys that take up the bight, so that the relation between the hand-operated mechanism and that actuated by the ropes or chains will remain the same in all positions of the cage and may be attached to levers or other devices therein.

Referring to the drawings, Figure 1 is a diagram or elevation of an elevator-cage and its connected parts arranged according to my invention. Fig. 2 is a view, partially in section, of the same elevator in a plane at right angles to Fig. 1.

Similar letters of reference on the two figures indicate corresponding parts.

The cage A moves between and is guided by the posts B B in the usual manner and is suspended by a rope C, passing over a pulley D; or the cage may be raised and lowered by means of a ram or piston beneath, my invention applying the same in either case.

At E is shown a valve such as controls the flow of water or the movements of the cage in a hydraulic elevator. The piston F of the valve is actuated by a rack G and pinion H, operated by a pulley I. Passing partially and oppositely around this pulley I and attached to the periphery thereof are two ropes J J. These ropes pass from the pulley I over two movable ones K K, and thence down to a fourth one L, mounted on and moving with the cage A. The ropes J J pass partially and oppositely around and are fastened to the periphery of this pulley L, the same as in the case of the one I, so as to produce a coincident movement of the two. On the axis S of the pulley L, mounted on the bottom of the cage A, is placed a lever T, by means of which an attendant in the cage can turn the pulley L to the right or to the left, and at the same time move the one I and the rack G by means of the ropes J J to the same extent or as the relative diameters of the two pulleys may determine. The lever T also serves as a means by which to adjust the pulley L and the pulley I simultaneously, so that the cage will ascend, descend, or stop.

Thus far my description applies to the cage and other parts when stationary and when the ropes J J are operating from fixed positions; but when the cage ascends or descends and the relative positions of the pulleys I and L are changed the tension of the ropes J J must be maintained accordingly. To do this, I employ the pulleys K K, mounted in a frame or shackle O, suspended by a rope P, passing over a pulley Q and attached to a movable weight R. As the cage A moves up or down these pulleys K K move in the same direction at one-half the speed of the cage, keeping the two ropes J J taut and maintaining the connection between the two pulleys I and L. On the same axis S there is a second lever U, which, on the extreme up or down stroke of the cage A, comes in contact with the stops V and W, so that the ropes J J and wheels L and I will be moved automatically and the cage stopped accordingly. The stop W is, of course, placed at the highest range of the cage and the one V at the lowest point. The tension-pulleys K K can be set in any position with respect to the cage—that is, their axis may be transverse to the position shown—and the ropes J J can be led in any direction over the idle-pulleys to reach valve or belt shifting mechanism distant from the cage, and also the wheels or pulleys I and L can be substituted with levers or cranks, such change being necessary to meet the requirements of special circumstances and in no way changing the nature of my invention.

Having thus described the nature and objects of my invention, what I claim, and desire to secure by Letters Patent, is—

1. In elevator-controlling gearing, the combination of the cage A, the water-controlling means consisting of a cylinder, piston, rack and pinion, and pulley I, up-and-down-traveling pulleys K K, pulley L, attached to the cage, ropes J J, passed partially and oppositely around and fastened to the pulleys I and L, hand-lever T, attached to the axle of the pulley L, rope P, suspended shackle-pulley Q, and movable weight R, substantially as described.

2. In elevator-controlling gearing, the combination of the cage A, the water-controlling means consisting of a cylinder, piston, rack and pinion, and pulley I, up-and-down-traveling pulleys K K, pulley L, attached to the cage, ropes J J, passed partially and oppositely around and fastened to the pulleys I and L, hand-lever T, attached to the axle of the pulley L, rope P, suspended shackle-pulley Q, and movable weight R, lever U, and stops V and W, substantially as described.

In testimony whereof I have hereunto affixed my signature in the presence of two witnesses.

ALEXANDER J. McADAM.

Witnesses:
  ALFRED A. ENQUIST,
  WILSON D. BENT, Jr.